(12) United States Patent
Pandharipande et al.

(10) Patent No.: US 12,386,060 B2
(45) Date of Patent: Aug. 12, 2025

(54) SYSTEMS AND METHODS FOR JOINT COMMUNICATION AND SENSING

(71) Applicant: NXP B.V., Eindhoven (NL)

(72) Inventors: Ashish Pandharipande, Eindhoven (NL); Wilhelmus Johannes van Houtum, Sint-oedenrode (NL)

(73) Assignee: NXP B.V., Eindhoven (NL)

( * ) Notice: Subject to any disclaimer, the term of this patent is extended or adjusted under 35 U.S.C. 154(b) by 370 days.

(21) Appl. No.: 18/045,912

(22) Filed: Oct. 12, 2022

(65) Prior Publication Data

US 2024/0125918 A1 Apr. 18, 2024

(51) Int. Cl.
*G01S 13/87* (2006.01)
*G01S 13/46* (2006.01)
(Continued)

(52) U.S. Cl.
CPC ........... *G01S 13/878* (2013.01); *G01S 13/46* (2013.01); *H04B 7/0617* (2013.01); *H04L 25/03006* (2013.01)

(58) Field of Classification Search
None
See application file for complete search history.

(56) References Cited

U.S. PATENT DOCUMENTS

2005/0157802 A1* 7/2005 Park .................... H04L 27/2647
375/348
2007/0159957 A1* 7/2007 Ljung ................. H04L 27/2605
370/208
(Continued)

FOREIGN PATENT DOCUMENTS

| EP | 4030847 A1 | 7/2022 | |
| LU | 100774 B1 * | 10/2019 | ........... G01S 13/003 |
| WO | 2016065169 A1 | 4/2016 | |
| WO | 2022027229 A1 | 2/2022 | |

OTHER PUBLICATIONS

Lou et al., "Multibeam Optimization for Joint Communication and Radio Sensing Using Analog Antenna Arrays," IEEE Transactions on Vehicular Technology, vol. 69, No. 10, Oct. 2020, 14 pages.
(Continued)

*Primary Examiner* — Vladimir Magloire
*Assistant Examiner* — Ashley Brown Raynal (57) ABSTRACT

Joint communication and sensing by a joint communication and sensing system in a wireless network is disclosed. A transmitter is arranged to transmit a first beam in a direction selected from a plurality of directions stored in a memory, where each direction corresponds to a direction of a respective remote device. The first beam comprises communication symbols to be communicated to the remote device in the direction during a communication session with the remote device. A reflection of the transmitted first beam is received via a receive antenna during the communication session, where the reflected first beam comprises the communication symbols. A position of one or more objects is identified based on a timing of transmission and receipt of the communication symbols in the transmitted first beam and the reflected first beam respectively and the sense symbols in the transmitted second beam and the reflected second beam respectively.

18 Claims, 6 Drawing Sheets

(51) Int. Cl.
    *H04B 7/06*     (2006.01)
    *H04L 25/03*     (2006.01)

(56) References Cited

U.S. PATENT DOCUMENTS

| | | | |
|---|---|---|---|
| 2019/0302229 A1* | 10/2019 | Ling | G01S 13/003 |
| 2021/0149016 A1 | 5/2021 | Murakami et al. | |
| 2022/0256519 A1* | 8/2022 | Jeon | H04W 72/0453 |
| 2023/0379735 A1* | 11/2023 | Bi | H04B 7/0695 |

OTHER PUBLICATIONS

Baquero Barneto et al., "Full-Duplex OFDM Radar With LTE and 5G NR Waveforms: Challenges, Solutions, and Measurements," IEEE Transactions on Microwave Theory and Techniques, vol. 67, No. 10, Oct. 2019, 13 pages.

* cited by examiner

_SYSTEMS AND METHODS FOR JOINT COMMUNICATION AND SENSING_

FIELD OF USE

This disclosure generally relates to a joint communication and sensing system, and more particularly to a communication system with a transmitter which transmits communication symbols in a beam to a remote device and a receiver which receives a reflection of the beam having the communication symbols which are used to determine a position of an object.

BACKGROUND

Beamforming is a process of focusing an electromagnetic beam in a particular direction for communication or sensing. In communication, a pencil beam is transmitted in a direction from a base station to a remote device to transmit communication symbols to the remote device. The pencil beam is typically a symmetrical beam of bundled electromagnetic energy in azimuth and elevation round in an axis. In sensing, a fan beam is transmitted to determine a position of objects in an environment. The fan beam has a narrow bandwidth in one direction and a wider bandwidth in another direction which is reflected off objects in the environment. The fan beam carries sensing symbols. In sensing, a receiver receives the reflected fan beam having the sensing symbols to determine the position of the objects.

DETAILED DESCRIPTION

The detailed description of the appended drawings is intended as a description of the various embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Overview

Embodiments disclosed herein are directed to a joint communication and sensing system having a plurality of modes including a probing mode, a downlink communication mode, and a sensing mode. In the probing mode, a transmitter of the system transmits a beam in a direction of a remote device. The remote device is in communication range of the system. The beam carries one or more communication symbols to be transmitted to the remote device during a communication session. Further, a receiver of the system receives a reflection of the transmitted beam during the communication session. The communication symbols in the transmitted beam and the reflected beam are used to determine a position of an object in an environment. Further, the communication symbols have a guard band field to reduce inter-symbol interference (ISI) of the communication symbols in the reflected beam resulting from reflection of the beam from an object further than the communication range. In other examples, ISI cancellation is used to reduce the ISI. In the downlink communication mode, the transmitter transmits one or more communication symbols in a beam and in a direction of a remote device in the communication range of the system during a communication session. Further, the receiver receives a reflection of the transmitted beam during the communication session. The communication symbols in the transmitted beam and in the reflected beam are used to determine a position of an object in an environment. ISI cancellation might not be performed in the downlink communication mode and in some examples a guard band size of the communication symbols in the probing mode is larger than the guard band size of the communication symbols in the downlink communication mode. In the sensing mode, a transmitter transmits a beam in directions other than those transmitted during the probing mode and downlink communication mode and which is reflected off additional objects in the environment and received by the receiver of the system. Sensing symbols in the transmitted and reflected beam which are not transmitted during a communication session are used to determine a position of the additional objects in the environment. In an example, a duration for performing the probing mode compared to the sensing mode and downlink communication mode is based on a number of remote devices which the system communicates with or a number of objects whose position is to be identified in the environment. Advantageously, determining the position of objects when both transmitting the beams with the communication symbols and sensing symbols allows for determining position of objects in real time rather than only in a sensing mode and also reduces a number of directions to transmit beams in the sensing mode. The beam with the sensing symbol might not be transmitted in directions which the beam with the communication symbols is transmitted in the communication mode. Well known instructions, protocols, structures, and techniques have not been shown in detail in order not to obfuscate the description.

Example Systems

Figure 1:
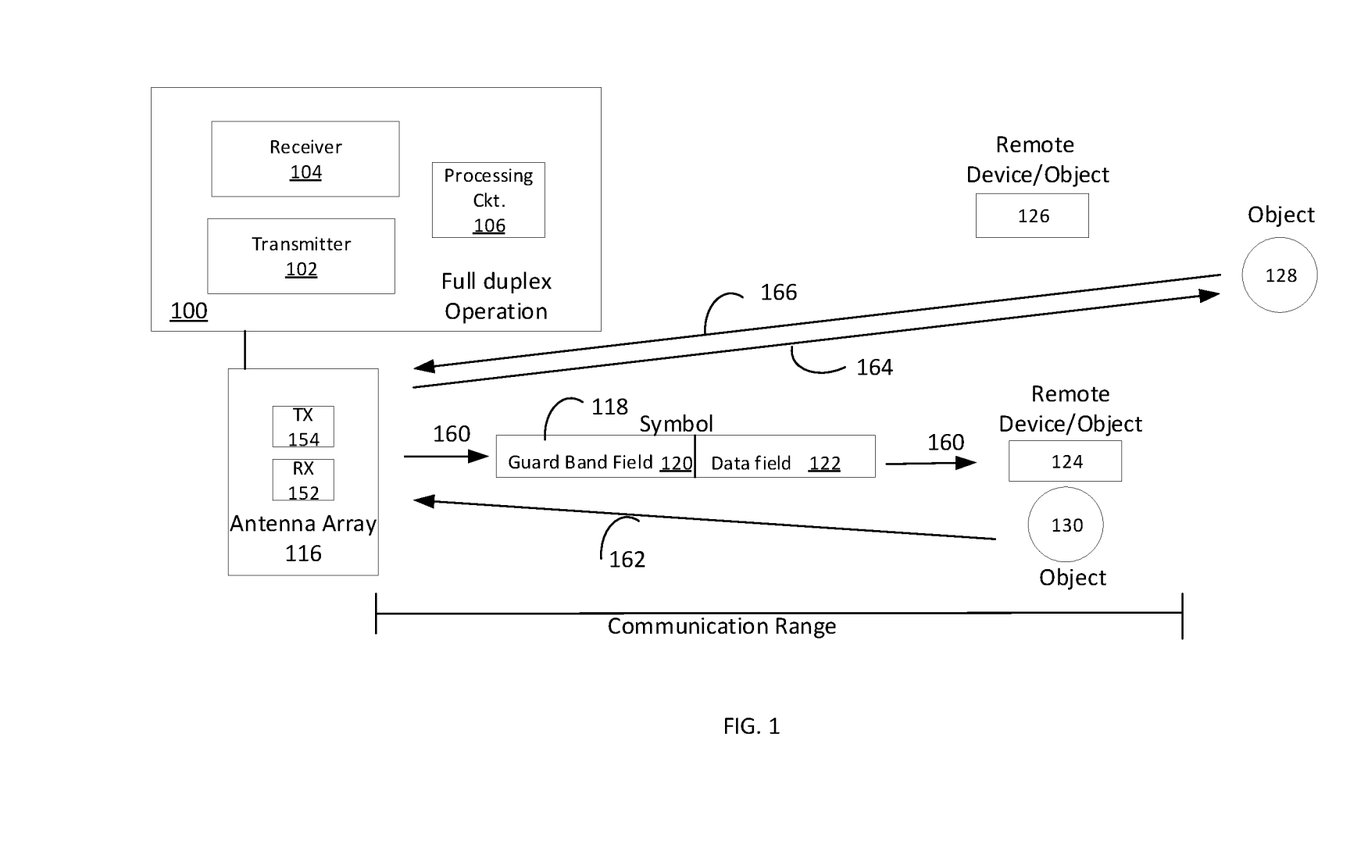
FIG. 1 illustrates a system arranged to perform joint communication and sensing of objects in accordance with an embodiment.

FIG. 1 is an example block diagram of a joint communication and sensing system 100 arranged to perform joint communication and sensing of objects in accordance with an embodiment. In an example, the system 100 may be located in a base station or other communication system of a wireless network and one or more remote devices may be in a communication range of the system 100, examples which are shown as remote device 124, 126. The remote device may take the form of a wireless device or application-specific or personal computerized devices such as, for example, transponder cards, personal digital assistants, tablets, cellular phones, smart phones, or key fobs. The communication range may define a distance where the system 100 may be able to reliably transmit and receive communication symbols to and from the one or more remote devices. The system 100 and the one or more remote devices may be in an environment which further includes one or more other objects within and outside the communication range of the system 100, examples which are shown as object 128 outside the communication range of the system 100 and object 130 within the communication range of the system 100. The objects 128, 130 may take different forms such as vehicles, people, or buildings in the environment. As described herein, the remote device may be also considered an object, but which also communicates with the system 100.

The system 100 may include a transmitter 102 to transmit the communication symbols to a remote device, a receiver 104 to receive the communication symbols from the remote device, a processing circuit 106, and an antenna array 116. In an example, the communication symbols that the transmitter 102 transmits may be transmitted as a multi-carrier signal of orthogonal subcarriers (referred to as orthogonal frequency division multiplexing (OFDM)) or as a single carrier signal. A single carrier signal may be a single frequency signal for carrying the communication symbols and a multi-carrier signal may be a multi-frequency signal for carrying the communication symbols. The receiver 104 may further receive communication symbols that are transmitted by the remote device. The transmitter 102 and receiver 104 of the system 100 may be coupled to the antenna array 116 to facilitate transmission and reception of the communication symbols. The antenna array 116 may have a plurality of antenna which transmit or receive signals. In an example, receive antenna 152 may be arranged to receive signals which carry the communication symbols having a first polarization and transmit antenna 154 may be arranged to transmit signals which carry the communication symbols with a second polarization, where the polarizations are either a horizontal or vertical polarization of the signals to allow for separation of the transmitted and received signals at the antenna array 116. Further, in examples, the transmitter 102 and receiver 104 may comprise one or more transmitters and receivers respectively associated with different modes of operation as described below.

The transmit antenna 154 may transmit the communication symbols as an electromagnetic beam. In an example, the beam may be arranged as a pencil beam. The pencil beam is typically a symmetrical beam of bundled electromagnetic energy in azimuth and elevation and round in an axis which is transmitted in a direction of a remote device which receive the communication symbols of the pencil beam. The pencil beam is typically formed by way of a beamforming method where one or more of the transmit antenna 154 transmit electromagnetic energy which constructively interfere and destructively interfere to form the pencil beam. The pencil beam improves a signal-to-noise ratio of the communication symbols which are transmitted to the remote device compared to other less coherent beams.

Symbol 118 is an example of the communication symbol transmitted by the system 100 or received by the system 100. The symbol 118 may have a guard band field 120 and a data field 122. The data field 122 may carry data and the guard band field 120 to reduce inter-symbol interference (ISI) in the reception of the communication symbol by the remote device. The data field 122 and guard band field 120 may be modulated on one or more carrier signals.

The data may be information which is to be transmitted to a remote device while the guard band field 120 may be an interval of the symbol 118 which does not carry unique information to be communicated to a remote device, but rather a repetition of a portion of the data in the symbol 118 known as a cyclic prefix of the symbol 118 or some other data. The guard band field 120 may reduce chances that a version of the symbol 118 which is reflected due to multipath propagation where the symbol 118 from the transmitter 102 reaches the remote device via multiple paths and interferes with the data field 122 of the symbol 118 producing the ISI. Since the various paths can be of different lengths, different versions of the symbol 118 may arrive at the system 100. These delays mean that part or all of the versions of the symbol 118 will otherwise be spread into the symbol 118, thereby interfering with the correct detection of the data of the symbol 118 and creating ISI. By providing the guard band field 120, the versions of the symbols 118 which arrive together will interfere with the guard band field 120 reducing chances that the different version of the symbol 118 will interfere with the data field 122 and data of the symbol 118. A guard band size of the guard band field 120 may be selected so that ISI will not interfere with the data field 122 of the communication symbol 118 so long as the system 100 and the remote device are within the communication range.

Embodiments disclosed herein are directed to the system 100 performing a joint communication and sensing system in an environment which includes the remote device and one or more objects. The transmitter 102 and the receiver 104 may be arranged in a probing or downlink mode as described in more detail below. In these modes, the transmitter 102 may transmit a beam 160 which carries communication symbols in the direction of a remote device in the communication range of the system 100 during a communication session between the transmitter 102 and the remote device. The communication session may conform with a wireless communication standard such as Institute of Electrical and Electronics Engineers (IEEE) 802.11 WiFi or 5G or 6G cellular standards defined by the 3rd Generation Partnership Project (3GPP) which defines transmission and reception of communication symbols wireless devices. The receiver 104 of the system 100 may also be arranged to receive from the receive antenna 152, a reflection of the transmitted beam 160 from one or more objects in the environment as a reflected beam 162 during the communication session. The one or more objects which reflect the transmitted beam 160 may be in a same general direction as the remote device which the transmitted beam 160 is transmitted. For example, object 130 may reflect the transmitted beam 160 directed to remote device 124 to produce reflected beam 162 while object 128 which is in the direction of remote device 126 and not remote device 124 may not produce a reflected beam. In an example, the transmitter 102 may transmit the communication symbols in a frequency range of the transmitted beam 160 and the receiver 104 may receive the communication symbols in a frequency range of the reflected beam 162, such that the system 100 operates in a full duplex. The communication symbol in the transmitted beam 160 and the communication symbol in the reflected beam 162 may be processed by a processing circuit 106 to determine a position of an object which reflected the transmitted beam 160. The position may be a range, azimuth, or elevation of an object in the environment with respect to the system 100. In an example, the processing circuit 106 may include a memory which stores an indication of a plurality of directions that identify a direction of a respective remote device in the environment. The memory may be a semiconductor memory such as random access memory (RAM) in an example. The direction of a particular remote device is identified from the plurality of directions and the beam having the communication symbols is transmitted in the direction so that the communication symbol is reliably received by the remote device.

In addition to the transmitter 102 transmitting communication symbols in a direction of a remote device, the transmitter 102 and receiver 104 may be arranged to transmit a beam which carries sensing symbols in a sensing mode. The sensing symbols may be predetermined symbols which do not need to be transmitted to and received by a particular remote device during a communication session and in an example the beam which carries the sensing symbols may be transmitted in directions other than the direction that a beam with communication symbols was transmitted. For example, a beam 164 which carries sensing symbols in a sensing mode may be transmitted in a direction which is a different direction from the direction of the beam 160 which carries communication symbols in a probing mode. The transmitted beam 164 which carries the sensing symbols may be reflected off additional objects in the environment such as object 128 and received by the receiver 104 of the system as a reflected beam 166. The sensing symbol in the transmitted beam 164 and the sensing symbol in the reflected beam 166 may be processed by the processing circuit 106 to determine a position of an object which reflected the transmitted beam 166. Advantageously, determining the position of objects when both transmitting the beams with the communication symbols and sensing symbols allows for determining position of objects in real time rather than only in a sensing mode and also reduces a number of directions to transmit beams in the sensing mode. The beam with the sensing symbol might not be transmitted in directions which the beam with the communication symbols is transmitted in the communication mode.

Figure 2:
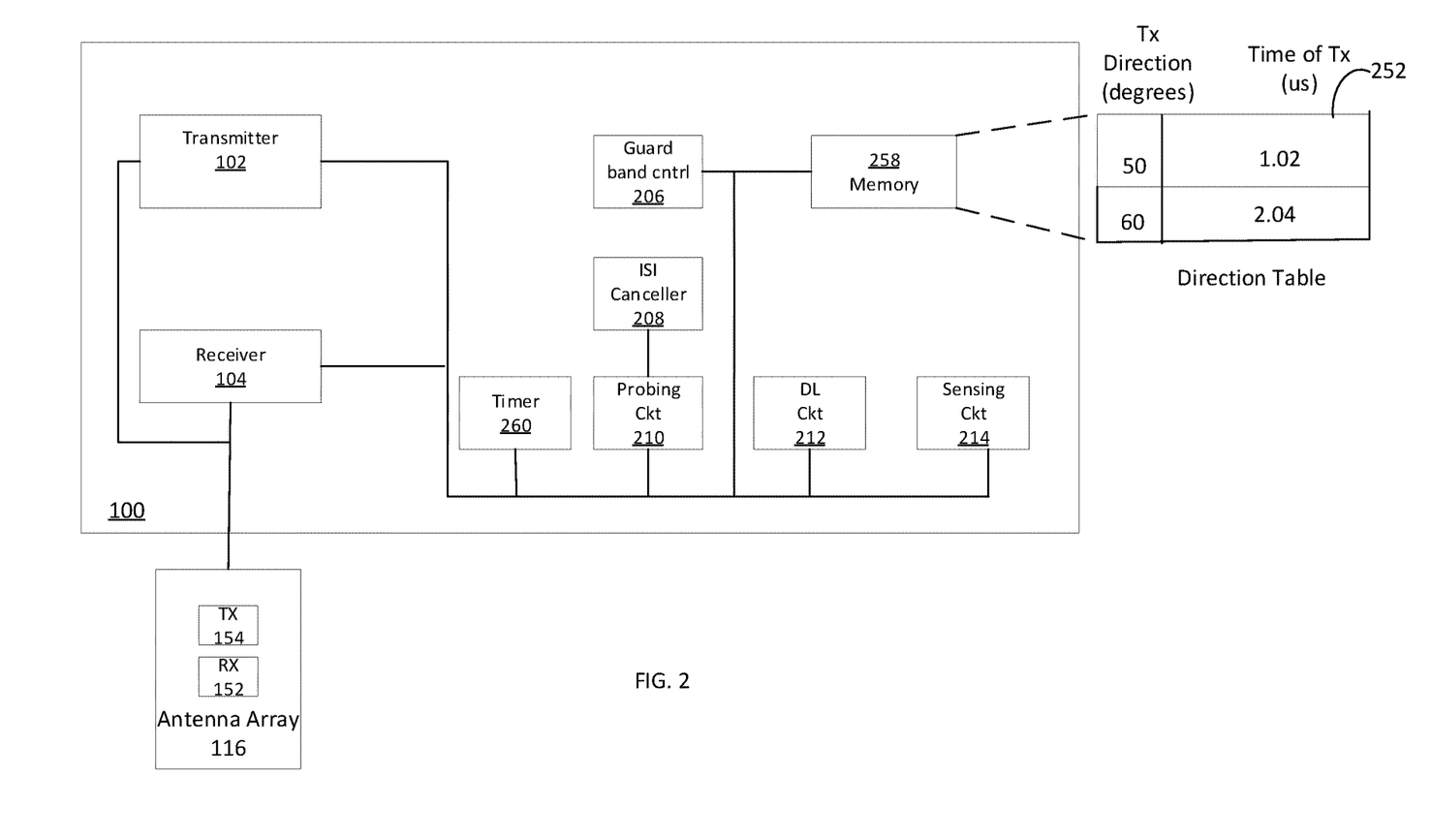
FIG. 2 is a detailed block diagram of the system in accordance with an embodiment.

FIG. 2 is an example block diagram of the joint communication and sensing system 100 in more detail in accordance with an embodiment. The system 100 may be arranged with one or more of probing circuitry 210, downlink (DL) circuitry 212, and sensing circuitry 214 to perform the joint communication and sensing. Each circuit may be implemented using circuitry such as one or more of analog circuitry, mix signal circuitry, memory circuitry, logic circuitry, and processing circuitry that executes code stored in a memory that when executed by the processing circuitry perform the disclosed functions, among other implementations.

The probing circuitry 210 may implement a probing mode where a beam is arranged to be transmitted to a remote device to transmit communication symbols of the beam to the remote device during a communication session. The probing circuitry 210 may also facilitate determining a position of an object further than the communication range as a result of the beam being reflected by the object in the environment and received by the receiver 104. The beam may carry communication symbols and the communication symbols in the reflected beam received by the receiver 104 may have IS'. The system 100 may have a guard band control 206 and an ISI canceller 208 to reduce the ISI. The guard band control 206 may adjust a guard band size of the communication symbols transmitted by the transmitter 102 in the beam so that ISI is reduced in the communication symbols of the beam which reflected by an object and received by the receiver 104. The guard band size may be set to reduce ISI for a communication symbol in a transmitted beam which is reflected by an object outside the communication range and received by the receiver 104. Additionally, or alternatively, the ISI canceller 208 may cancel ISI in the received communication symbols. The ISI canceller 208 may perform signal processing to reduce the ISI in the received communication symbols.

In an example, the probing circuitry 210 may signal the guard band control 206 to set the guard band size. The transmitter 102 may then transmit a known communication symbol in a beam during a communication session between the transmitter 102 and the remote device and the receiver 104 may receive a reflection of the beam during the communication session. A determination is made that the known communication symbol is received in the reflected beam based on the reduction in ISI as a result of the guard band field and the ISI canceller 208 performing ISI cancellation. A position of an object is then identified. The position may be characterized as a range (distance) of the object determined based on a time when the known communication symbol was transmitted and a time when the known communication symbol was received. To facilitate this determination, the system 100 may have a timer 260 which defines a time with respect to a reference clock to measure a time interval (time of flight) between transmission and receipt of the communication symbol. The time interval may then indicate a range of an object which reflected by the beam having the known communication symbol. The system 100 may also determine a velocity of an object based on a change in range of the object measured over a period of time. The position of the object may also be characterized as an angle and an elevation with respect to the system 100. As is commonly performed in radar-systems, the angular information may be obtained by applying a frequency transformation, e.g., a two dimensional Fast Fourier Transformation (EFT) to the reflected beam received from multiple receive antenna of a multiple-input-multiple output (MIMO) antenna of the antenna array 116 and performing processing to determine a position of the object in terms of one or more of the elevation and azimuth with respect to the system 100.

The downlink circuitry 212 implements a downlink communication mode which may also facilitate communication of the communication symbols to a remote device during a communication session. Unlike the probing circuitry 110, the downlink circuitry 210 may size the guard band field 120 of the communication symbol to reduce ISI of communication symbols in a transmitted beam reflected by an object within the communication range but not outside the communication range. The downlink circuitry 212 may signal the guard band control 206 to define the guard band size in the downlink mode to be smaller than in the probing mode. A known communication symbol may be transmitted during a downlink communication mode and a communication session between the transmitter 102 and the remote device. A determination is made that the known communication symbol is then received by the system 100 during the communication session. Further, the downlink circuitry 212 may determine the position of objects based on the transmission of the beam having the known communication symbols and reflection by the objects of the beam having the known communication symbols. Data throughput in the downlink communication mode is increased because there is less delay between communication symbols due to the smaller guard band field 120. Further, throughput is also increased in the downlink communication mode compared to the probing mode because no ISI cancellation is performed and the system 100 may have available compute power to transmit the communication symbols at a higher rate.

The sensing circuitry 214 may implement a sensing mode where the transmitter 102 is arranged to transmit beams such as the pencil beams or asymmetric beam such as fan beams with a predefined symbol which is then received by the system 100. In an example, the predefined symbol may have a format similar to the communication symbol 118 and is not transmitted as part of a communication session. The predefined symbol may facilitate determining a position of an object. Beams with the predefined symbol may be transmitted in different directions other than those directions which the beams are transmitted by the probing circuitry or the downlink circuitry when communication symbols are transmitted to a remote device and the predefined symbol is then received to determine the position of the object.

In an example, the base station may have a direction table 252 stored in a memory 258 which stores directions that the beam has been transmitted during one or more of the probing mode and downlink mode. In an example, the direction table 252 may indicate that a beam has been transmitted at a 50 degree angle (with respect to a center of a main lobe of the beam) and a 60 degree angle with respect to the system 100. This table 252 may be updated in each of the probing mode and the downlink communication mode as the beam is transmitted in a particular direction. In an example, the sensing circuitry 214 may access this direction table 252 to cause a beam with the predefined symbol to be transmitted in directions other than which was previously transmitted in the probing mode and downlink communication modes to determine positions of objects in the environment not detected during the probing mode and downlink communication modes.

The system 100 may communicate with one or more remote devices to transmit communication symbols to the remote devices. A duration that the system 100 operates in the probing mode and the downlink communication mode compared to the sensing mode may be directly related to a number of remote devices that the system 100 communicates with. A duration that the system 100 is in the probing mode and the downlink communication mode compared to the sensing mode may be more as the number of remote devices the system 100 communicates with increases to maintain a desired throughput of communication symbols transmitted from the system 100 to a remote device. Further, the system 100 may not need to operate in the sensing mode as long because objects are identified already as part of the probing and downlink communication modes. In an example, the timer 260 may be used to keep track of a time that the system 100 is in the probing and downlink communication mode versus other modes so that the system 100 transitions between the modes in accordance with the number of remote devices communicated with.

In an example, the timer 260 may be used to keep track of a time of how long ago objects were identified in a particular direction. In an example, the direction table 252 may store a time that a beam is transmitted in a particular direction based on a value of the timer 260 when the beam is transmitted in the particular direction which is updated in the table 252. If the time of how long ago objects were identified in a particular direction compared to the value of the timer 260 exceeds a threshold, the sensing circuitry 214 may transmit the beam in the particular direction to again determine a position of objects in the direction. For example, if the timer 260 indicates a time of 3.5 microseconds (μs) and a threshold is 1 μs, then a beam may be transmitted in the directions 50 degrees and 60 degrees as shown in table 252 because the time of 3.5 us is greater by the threshold his to the times when beams were transmitted in these directions.

In an example, a duration that the system 100 operates in the sensing mode may be based on a number of objects whose position is to be identified by the system 100. If the system 100 is located in a vehicle, the vehicle may move from an urban environment to a rural environment. In an example, a navigation system of the vehicle may be configured to indicate to the system 100 the type of environment in which the system 100 is located (e.g., urban or rural area) and the system 100 may adjust the duration that the system 100 operates in the sensing mode based on the environment. For example, the duration for the sensing mode may be increased for urban areas to identify the position of many objects typically estimated as present compared to a duration for the sensing mode in the rural area which may be decreased to identify the position of fewer objects typically estimated as present.

Example Methods

Figure 3:
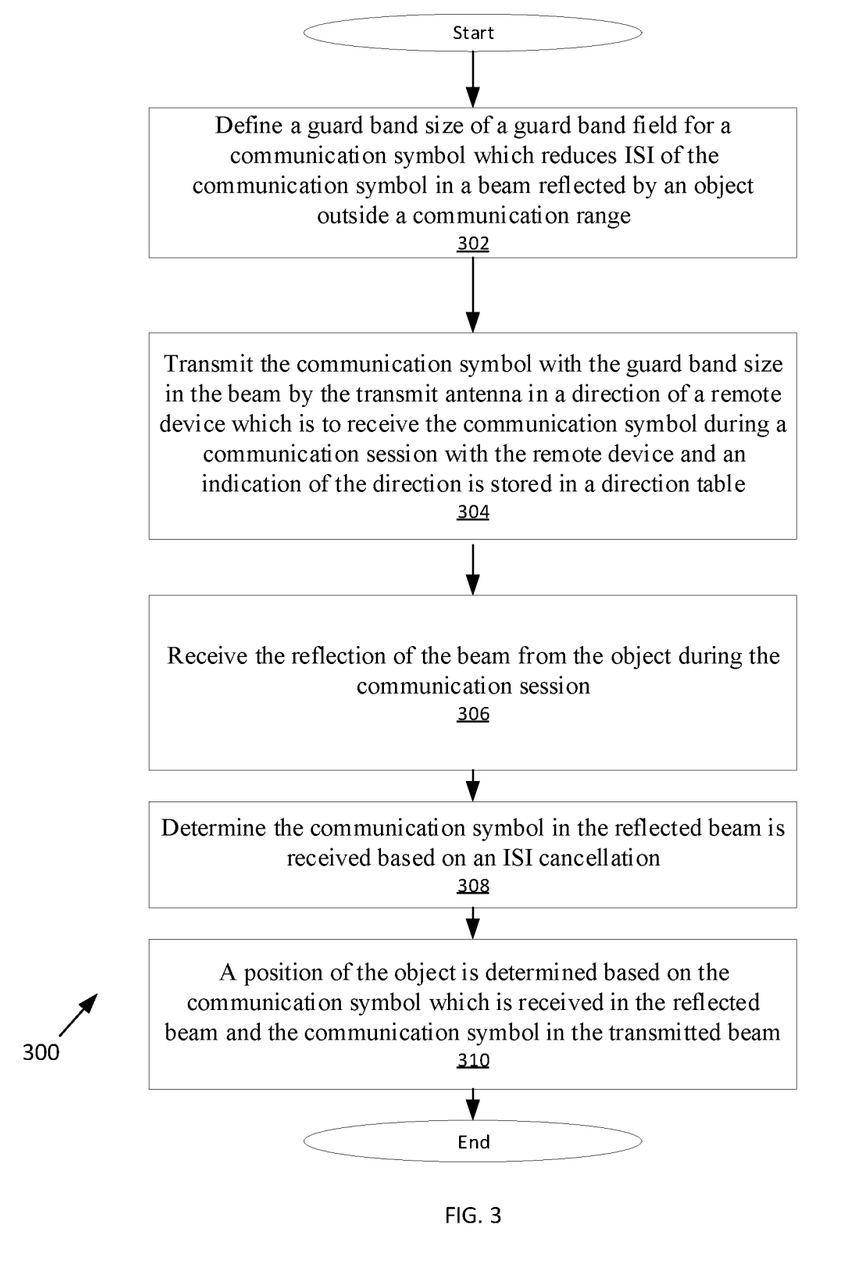
FIG. 3 is a flow chart of example functions associated with a probing mode of the system in accordance with an embodiment.

FIG. 3 is a flowchart of functions 300 associated with the probing mode in accordance with an embodiment. The functions may be performed by the system 100 in an example. At 302, a guard band size of a guard band field for a communication symbol may be defined. In an example, the guard band size may be larger than the guard band size in the downlink communication mode such that ISI of communication symbols in a beam reflected by an object outside a communication range of the system is reduced. At 304, the communication symbol with the defined guard band field is transmitted in the beam by the transmit antenna in a direction of a remote device which is to receive the communication symbol during a communication session with the remote device and an indication of the direction is stored in a direction table. The direction table may indicate directions which sensing is performed based on the communication with the remote device. At 306, the reflection of the beam with the communication symbol from the object is received during the communication session. In an example, the transmitter and receiver may be operating in a full duplex. At 308, a determination is made based on ISI cancellation that the reflected beam has the communication symbol which was transmitted in the transmitted beam. At 310, a position of the object is determined based on the communication symbol which is received in the reflected beam and the communication symbol in the transmitted beam. In an example, a time between when the communication symbol is transmitted and when the communication symbol is received is used to determine the position of the object, such as a range of the object. The position may be characterized as an elevation or azimuth in other examples.

Figure 4:
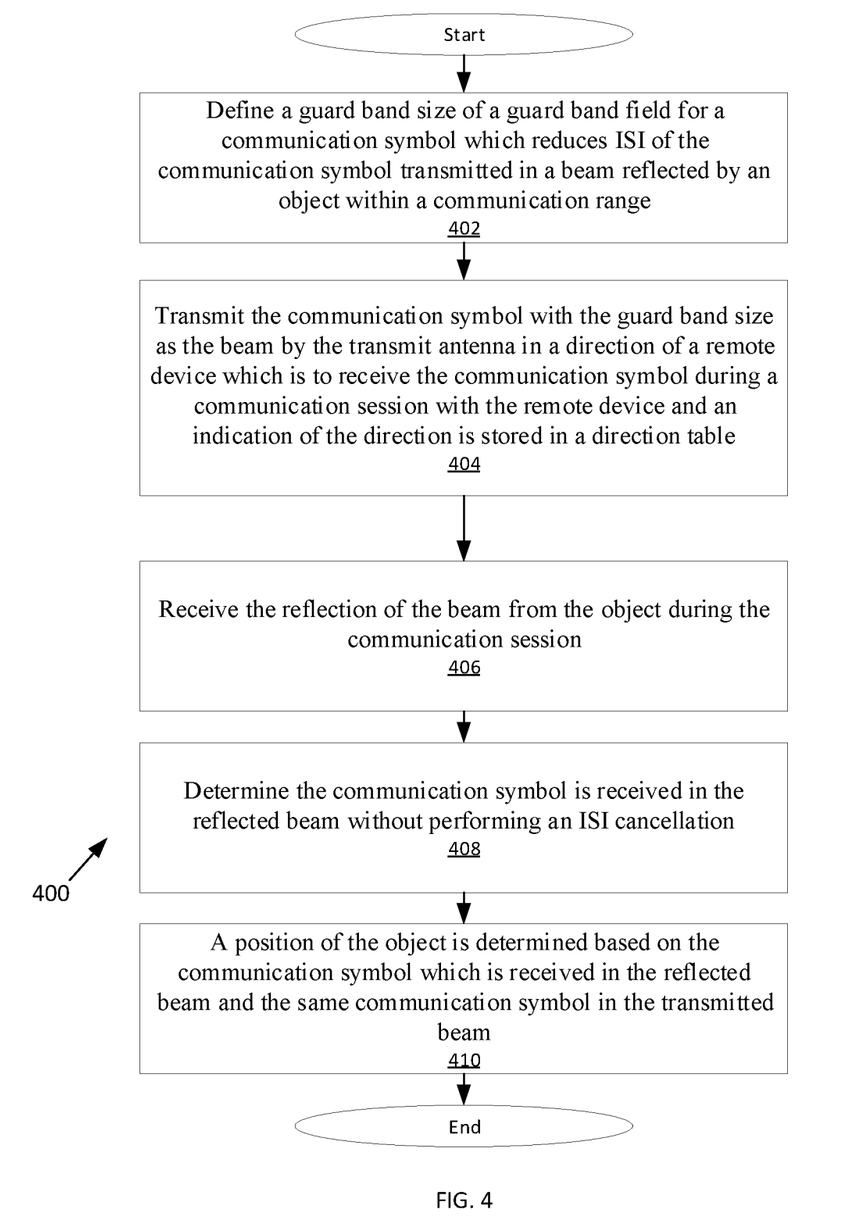
FIG. 4 is a flow chart of example functions associated with a downlink communication mode of the system in accordance with an embodiment.

FIG. 4 is a flowchart of functions 400 associated with the downlink communication mode in accordance with an embodiment. The functions may be performed by the system 100 in an example. At 402, a guard band size of a guard band field for a communication symbol is defined in a downlink communication mode. In an example, the guard band size may be smaller than the guard band size in the probing mode and which reduces ISI of communication symbols in a beam reflected by an object within a communication range. At 404, the communication symbol with the defined guard band size is transmitted in the beam by the transmit antenna in a direction of a remote device which is to receive the communication symbol during a communication session with the remote device and an indication of the direction is stored in a direction table. The direction table may indicate directions which the transmitted beam is transmitted. At 406, the reflection of the beam with the communication symbol from the object in the environment is received during the communication session. In an example, the transmitter and receiver may be operating in a full duplex. At 408, a determination is made that the communication symbol in the reflected beam is received without performing an ISI cancellation. At 410, a position of the object is determined based on the communication symbol which is received in the reflected beam and the communication symbol in the transmitted beam. In an example, a timing between when the communication symbol is transmitted and when the communication symbol is received is used to determine the position of the object, such as a range of the object. The position may be characterized as an elevation or azimuth in other examples.

Figure 5:
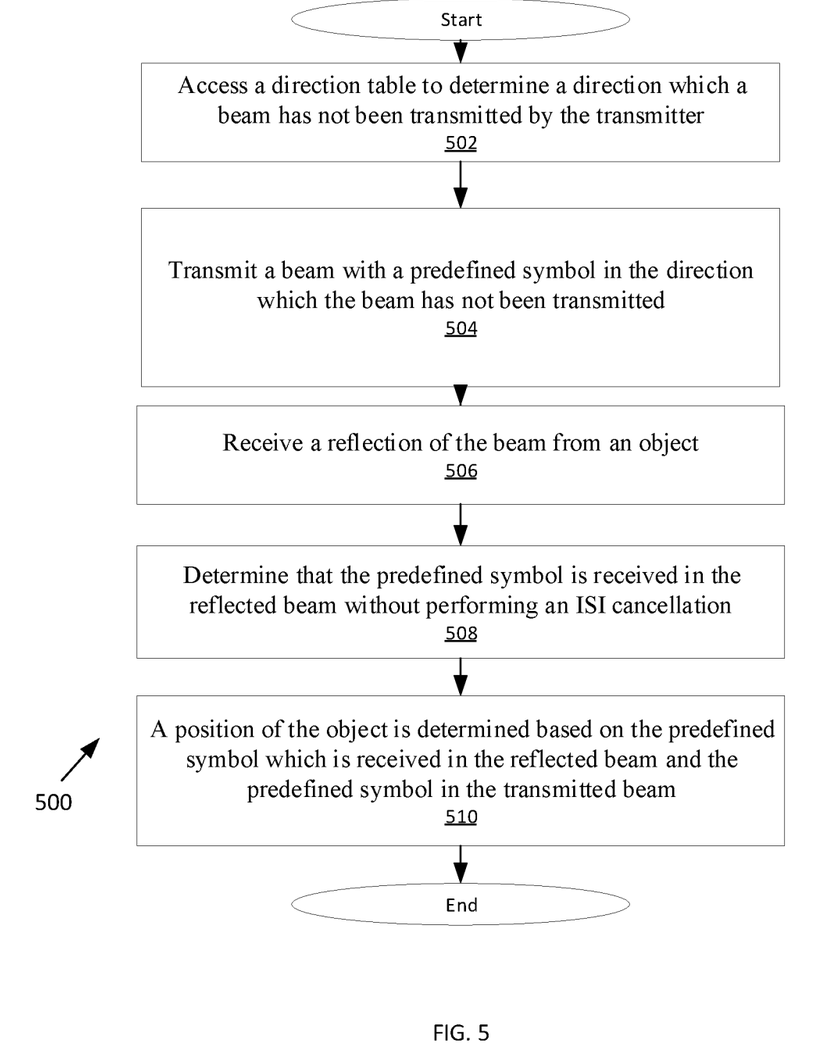
FIG. 5 is a flow chart of example functions associated with a sensing mode of the system in accordance with an embodiment.

FIG. 5 is a flowchart 500 of functions associated with the sensing mode in accordance with an embodiment. The functions may be performed by the system 100 in an example. At 502, a direction table is accessed to determine a direction which a beam has not been transmitted by the transmitter for a certain time. The direction which the beam has not been transmitted indicates a direction where communication symbols have not been transmitted to a remote device and position of objects in those directions in the environment might not be identified. At 504, the beam is transmitted in the direction. The beam may have a predefined symbol optimized for determining a position of an object and which may not change over time as compared to a communication symbol which may carry real-time data. For example the sense-symbol might be an impulse-like waveform obtained by applying ones to all OFDM-subcarriers, the intercarrier-spacing might be set to large(r)-value compared to the downlink modes and sensing modes, and/or the cyclic-prefix of the OFDM-symbol might be extended to, for example, the OFDM-symbol-time without the cyclic-prefix (i.e., the reciprocal of the intercarrier-spacing). The predefined symbol may be transmitted as an ODFM waveform with a low peak to average power radio or a non-OFDM waveform such as a frequency modulated continuous waveform (FMCW) or pulse modulated continuous waveform (PMCW). The beam which carries the waveform may take the form of a pencil beam directed in the direction or an asymmetric beam such as fan beam with a narrow bandwidth in one direction and a wider bandwidth in another direction which is reflected off objects in the environment to determine a position of an object. At 506, a reflection of the beam with the predetermined symbol is received from an object. At 508, a determination is made that the predefined symbol in the reflected beam is received without performing an ISI cancellation. At 510, a position of an object is determined based on the predefined symbol which is received in the reflected beam and the predefined symbol in the transmitted beam. In an example, a timing between when the predefined symbol is transmitted and when the predefined symbol is received is used to determine the position of the object, such as a range of the object. The position may be characterized as an elevation or azimuth in other examples.

Example Apparatus

Figure 6:
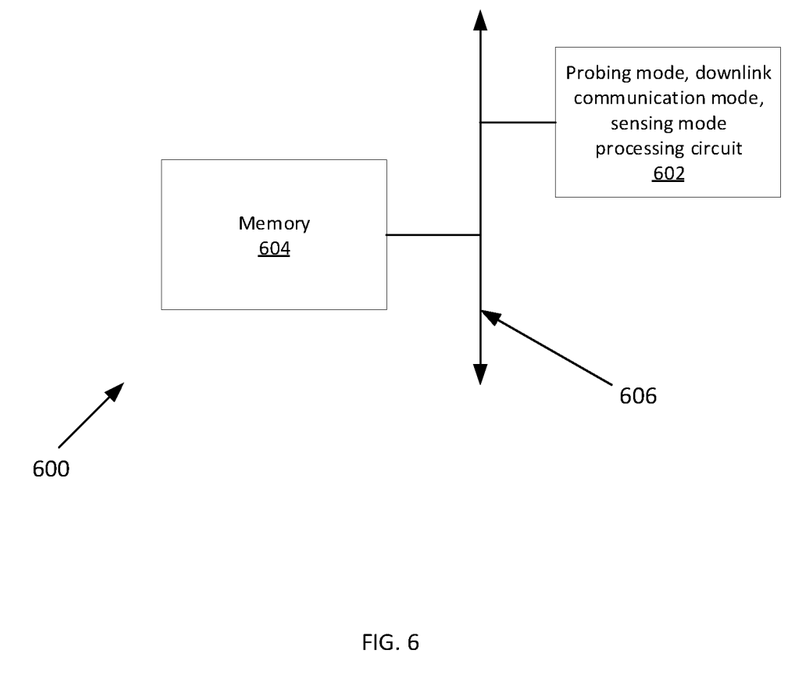
FIG. 6 is an example arrangement of the probing circuitry, downlink circuitry, or sensing circuitry of the system in accordance with an embodiment.

FIG. 6 is an example arrangement of circuitry 600 for performing functions of the probing mode, downlink communication mode, and sensing mode in accordance with an embodiment. The circuitry comprises processing circuitry 602 (possibly including logic circuitry, hardware, multiple processors, multiple cores, multiple nodes, and/or implementing multi-threading, etc.) and memory 604 such as system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more other possible realizations of non-transitory machine-readable media/medium for performing functions of the probing mode, downlink communication mode, and sensing mode. In some examples, the memory 604 may store computer code, program instructions, computer instructions, program code associated with performing the functions of the probing mode, downlink communication mode, and sensing mode as described herein which is executable by the processing circuit 602. Interconnect 606 such as a bus (e.g., PCI, ISA, PCI-Express) may couple the processing circuit 602 and the memory 604 in an example.

In one embodiment, a method for joint communication and sensing by a joint communication and sensing system in a wireless network is disclosed. The method comprises transmitting a first beam in a direction selected from a plurality of directions stored in a memory, wherein each direction corresponds to a direction of a respective remote device, the first beam comprising communication symbols to be communicated to the remote device in the direction during a communication session with the remote device, the communication system in a communication range with the remote device; receiving a reflection of the transmitted first beam via a receive antenna during the communication session, the reflected first beam comprising the communication symbols; transmitting a second beam comprising sense symbols via a transmit antenna; receiving a reflection of the transmitted second beam via the receive antenna, the reflected second beam comprising the sense symbols; and identifying a position of one or more objects based on a timing of transmission and receipt of the communication symbols in the transmitted first beam and the reflected first beam respectively and the sense symbols in the transmitted second beam and the reflected second beam respectively. In an example, a direction that the second beam is transmitted is based on a direction that the first beam is transmitted. In an example, a first guard band size of the communication symbols of the first beam is greater than a second guard band size of another communication symbol of a third beam transmitted to another remote device, the transmitted third beam reflected by another object and used to identify a position of the other object. In an example, an object detection range based on the first beam with the communication symbol is greater than an object detection range of the third beam with the other communication symbol. In an example, identifying the one or more objects comprises performing intersymbol interference (ISI) cancellation for the communication symbols of the first beam. In an example, a direction that the second beam is transmitted is different from the plurality of directions. In an example, a duration that the first beam is transmitted is based on a number of remote devices to which the communication symbols are transmitted. In an example, a duration which the second beam is transmitted is based an estimate of a number of objects whose positions are to be identified. In an example, the method further comprises storing an indication of a direction which the first beam is transmitted in the memory and transmitting the second beam in a direction other than the direction that the first beam is transmitted which is indicated in the memory.

In another embodiment, a joint communication and sensing system is disclosed. The system comprises a first transmitter arranged to transmit a first beam in a direction selected from a plurality of directions stored in a memory, wherein each direction corresponds to a direction of a respective remote device, the first beam comprising communication symbols to be communicated to the remote device in the direction during a communication session with the remote device, the communication system in a communication range with the remote device; a first receiver arranged to receive a reflection of the transmitted first beam via a receive antenna during the communication session, the reflected first beam comprising the communication symbols;

a second transmitter arranged to transmit a second beam comprising sense symbols via a transmit antenna; a second receiver arranged to receive a reflection of the transmitted second beam via the receive antenna, the reflected second beam comprising the sense symbols; and processing circuitry arranged to identify a position of one or more objects based on a timing of transmission and receipt of the communication symbols in the transmitted first beam and the reflected first beam respectively and the sense symbols in the transmitted second beam and the reflected second beam respectively. In an example, a direction that the second beam is transmitted is based on a direction which the first beam is transmitted. In an example, a first guard band size of the communication symbols of the first beam is greater than a second guard band size of another 14 communication symbol of a third beam transmitted to another remote device, the transmitted third beam reflected by another object and used to identify a position of the other object. In an example, an object detection range based on the first beam with the communication symbol is greater than an object detection range of the third beam with the other communication symbol. In an example, the processing circuitry arranged to identify the one or more objects comprises performing intersymbol interference (ISI) cancellation for the communication symbols of the first beam. In an example, a direction that the second beam is transmitted is different from the plurality of directions stored in the memory. In an example, a duration that the first beam is transmitted is based on a number of remote devices to which the communication symbols are transmitted. In an example, a duration which the second beam is transmitted is based an estimate of a number of objects whose positions are to be identified. In an example, the second transmitter is arranged to transmit the second beam in a direction other than the direction that the first beam is transmitted which is indicated in the memory. In an example, the first transmitter is arranged to transmit the communication symbols of the first beam in a frequency range and the first receiver is arranged to receive the reflected communication symbols in the frequency range, the first transmitter and first receiver operating in a full duplex. In an example, the first beam and second beam is defined by a single carrier signal or a multi-carrier signal to carry the communication symbol or sensing symbol.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. Other implementations fall within the scope of the following claims.

We claim:

1. A method for joint communication and sensing by a joint communication and sensing system in a wireless network, the method comprising:
   transmitting a first beam in a direction, the first beam comprising communication symbols to be communicated to a remote device during a full duplex communication session with the remote device;
   receiving a reflection of the transmitted first beam via a receive antenna, the reflected first beam comprising the communication symbols;
   transmitting a second beam comprising sense symbols different from the communication symbols via a transmit antenna;
   receiving a reflection of the transmitted second beam via the receive antenna, the reflected second beam comprising the sense symbols; and
   identifying a position of one or more objects outside of a communication range of the first beam and the remote device based on a timing of transmission and receipt of the communication symbols in the transmitted first beam and the reflected first beam respectively and obtaining a position of one or more objects based on the sense symbols in the transmitted second beam and the reflected second beam;
   wherein a guard band of the communication symbols in the first beam is larger than a guard band of communication signals of a transmitted third beam used only for full duplex communication with the remote device and a cyclic prefix of an Orthogonal Frequency Division Multiplexed (OFDM) waveform of the second beam is extended to an OFDM symbol time of the OFDM waveform without the cyclic prefix.

2. The method of claim 1, wherein a direction that the second beam is transmitted is based on a direction that the first beam is transmitted.

3. The method of claim 1, wherein an object detection range based on the first beam with the communication symbol is less than an object detection range of the second beam.

4. The method of claim 1, wherein identifying the one or more objects comprises performing intersymbol interference (ISI) cancellation for the communication symbols of the first beam.

5. The method of claim 1, wherein a direction that the second beam is transmitted is different from a direction that the first beam is transmitted.

6. The method of claim 1, wherein a duration that the first beam is transmitted is based on a number of remote devices to which the communication symbols are transmitted.

7. The method of claim 1, wherein a duration which the second beam is transmitted is based an estimate of a number of objects whose positions are to be identified.

8. The method of claim 1, further comprising storing an indication of a direction which the first beam is transmitted in the memory and transmitting the second beam in a direction other than the direction that the first beam is transmitted which is indicated in the memory.

9. A joint communication and sensing system comprising:
- a first transmitter arranged to transmit a first beam in a direction, the first beam comprising communication symbols to be communicated to the remote device during a full duplex communication session with the remote device;
- a first receiver arranged to receive a reflection of the transmitted first beam via a receive antenna, the reflected first beam comprising the communication symbols;
- a second transmitter arranged to transmit a second beam comprising sense symbols different from the communication symbols via a transmit antenna;
- a second receiver arranged to receive a reflection of the transmitted second beam via the receive antenna, the reflected second beam comprising the sense symbols; and
- processing circuitry arranged to identify a position of one or more objects outside of a communication range of the first beam and the remote device based on a timing of transmission and receipt of the communication symbols in the transmitted first beam and the reflected first beam respectively and obtaining a position of one or more objects based on the sense symbols in the transmitted second beam and the reflected second beam;
- wherein a guard band of the communication symbols in the first beam is larger than a guard band of communication signals of a transmitted third beam used only for full duplex communication with the remote device and a cyclic prefix of an Orthogonal Frequency Division Multiplexed (OFDM) waveform of the first beam is extended to an OFDM symbol time of the OFDM waveform without the cyclic prefix.

10. The system of claim 9, wherein a direction that the second beam is transmitted is based on a direction which the first beam is transmitted.

11. The system of claim 9, wherein a first guard band size of the communication symbols of the first beam is greater than a second guard band size of another communication symbol of a third beam transmitted to another remote device, the transmitted third beam reflected by another object and used to identify a position of the other object.

12. The system of claim 11, wherein an object detection range based on the first beam with the communication symbol is less than an object detection range of the second beam.

13. The system of claim 9, wherein the processing circuitry arranged to identify the one or more objects comprises performing intersymbol interference (ISI) cancellation for the communication symbols of the first beam.

14. The system of claim 9, wherein a direction that the second beam is transmitted is different from a direction that the first beam is transmitted.

15. The system of claim 9, wherein a duration that the first beam is transmitted is based on a number of remote devices to which the communication symbols are transmitted.

16. The system of claim 9, wherein a duration which the second beam is transmitted is based an estimate of a number of objects whose positions are to be identified.

17. The system of claim 9, wherein the first transmitter is arranged to transmit the communication symbols of the first beam in a frequency range and the first receiver is arranged to receive the reflected communication symbols in the frequency range, the first transmitter and first receiver operating in a full duplex.

18. The system of claim 9, wherein the first beam and second beam are defined by a single carrier signal or a multi-carrier signal to carry the communication symbol or sensing symbol.

* * * * *